United States Patent
Kitada

[11] 3,918,296
[45] Nov. 11, 1975

[54] PULSE REFLECTION TYPE ULTRASONIC THICKNESS METER

[75] Inventor: Toyohiko Kitada, Sagamihara, Japan

[73] Assignee: Kabushikikaisha Tokyo Keiki, Tokyo, Japan

[22] Filed: Oct. 3, 1973

[21] Appl. No.: 403,098

[30] Foreign Application Priority Data
Oct. 10, 1972  Japan................................ 47-101351

[52] U.S. Cl. ................................................ 73/67.7
[51] Int. Cl.² ...................................... G01B 17/02
[58] Field of Search ................ 73/67.7, 67.8 R, 67.9

[56] References Cited
UNITED STATES PATENTS

| | | |
|---|---|---|
| 3,048,031 | 8/1962 | Beaujard et al. .................. 73/67.8 R |
| 3,427,866 | 2/1969 | Weighart .......................... 73/67.9 X |
| 3,576,126 | 4/1971 | Weighart .............................. 73/67.7 |
| 3,605,504 | 9/1971 | Kummer, Jr. et al. ................ 73/67.7 |
| 3,690,154 | 9/1972 | Wells et al. .......................... 73/67.9 |

Primary Examiner—Charles A. Ruehl
Attorney, Agent, or Firm—Hill, Gross, Simpson, Van Santen, Steadman, Chiara & Simpson

[57] ABSTRACT

A pulse reflection type ultrasonic thickness meter having an ultrasonic transducer which produces an ultrasonic pulse wave and transmits it to an object to be measured and receives an echo pulse from the object and includes an automatic gain control circuit to control the height of the echo pulse. A circuit is provided which controls the automatic gain control circuit when the echo pulse is smaller than a predetermined value, so that the echo pulse can be maintained substantially constant over a necessary range.

3 Claims, 8 Drawing Figures

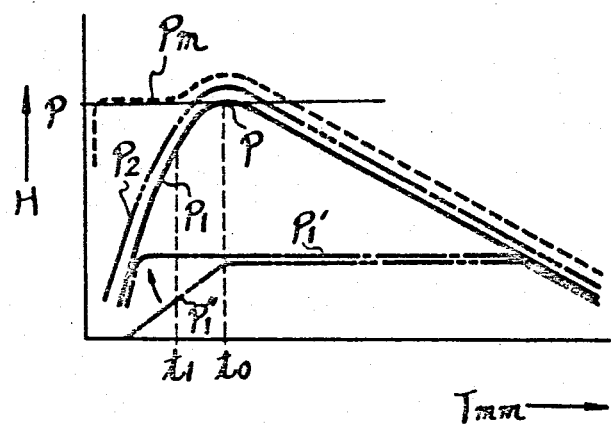
Fig. 1
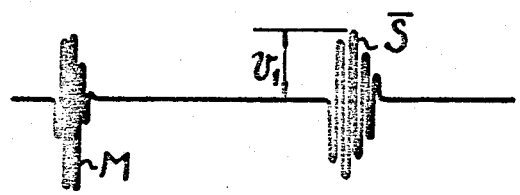
Fig. 2A
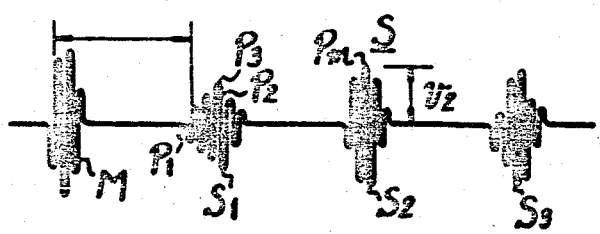
Fig. 2B
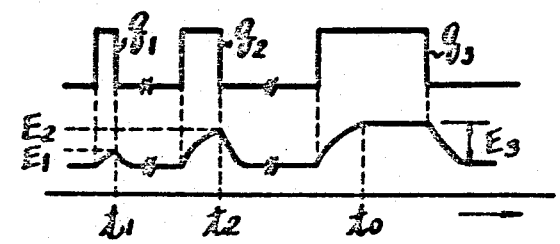
Fig. 4A
Fig. 4B
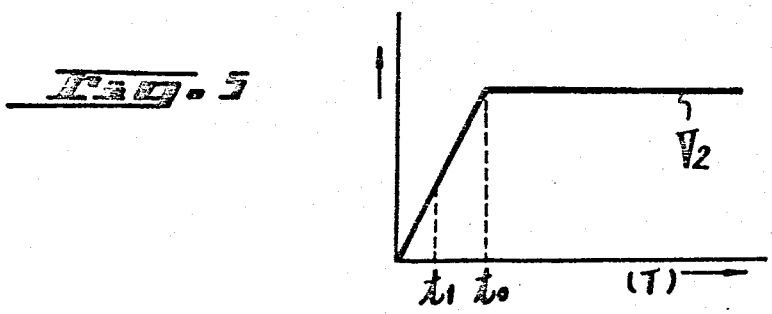
Fig. 5

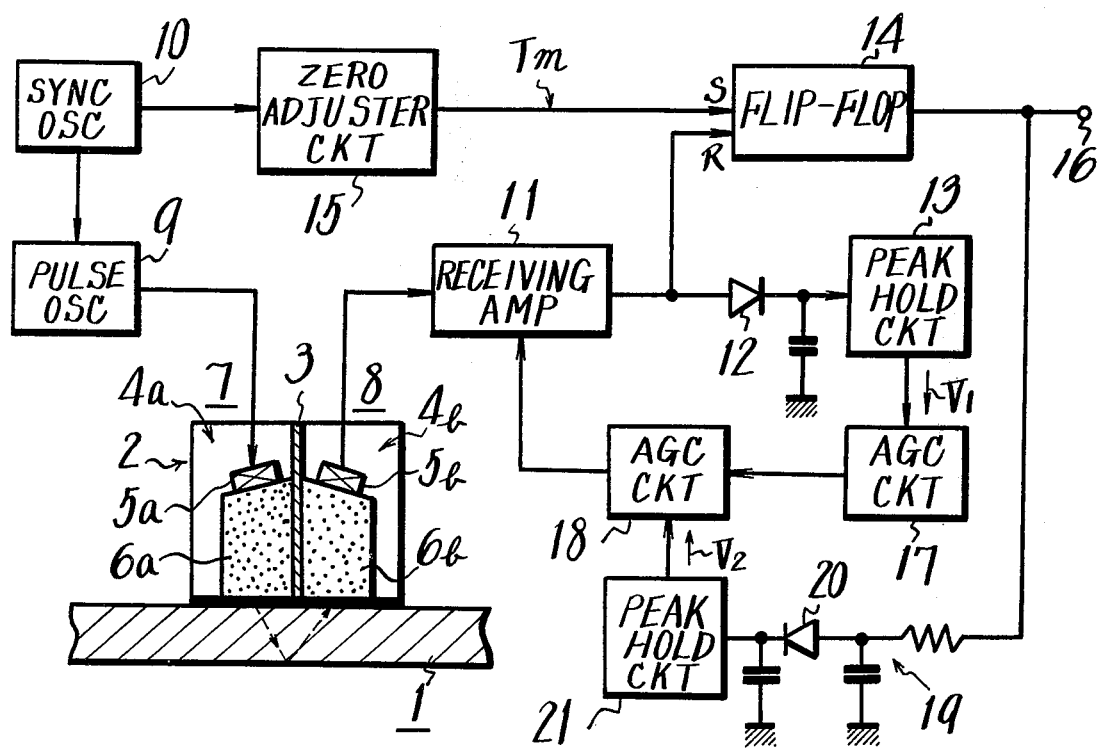
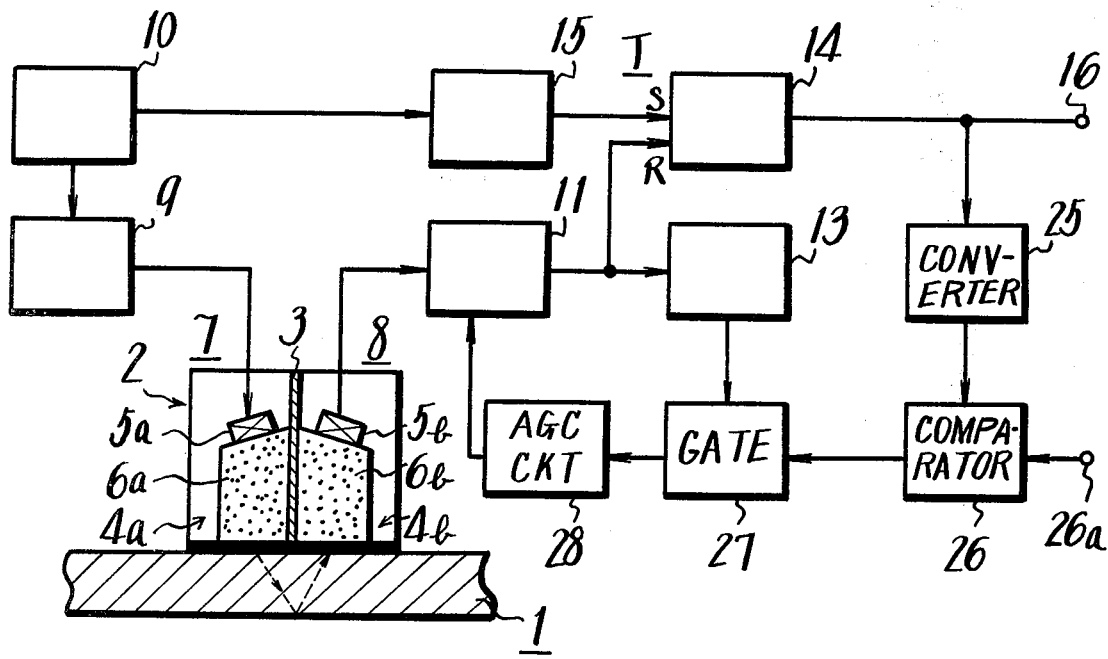

PULSE REFLECTION TYPE ULTRASONIC THICKNESS METER

BACKGROUND OF THE INVENTION

1. Field of the Invention

This invention relates generally to a pulse reflection type ultrasonic thickness meter, and more particularly to a pulse reflection type ultrasonic thickness meter in which the height of a reflection echo of ultrasonic waves is held within a certain range and a measuring point is selected at a substantially fixed height of the reflection echo, to provide for enhanced accuracy in the measurement of the thickness of an object.

2. Description of the Prior Art

In general, a two-probe reflection method enables the measurements of the thickness of objects from relatively thin to thick in thickness, even if the objects surfaces are not in good condition. With this method, however, the characteristic of a reflection echo is such as shown in FIG. 1 due to the characteristic of the probe. The abscissa represents the thickness T of an object measured in mm. and the ordinate represents the height H of the reflection echo. The reflected echo $P_1$ (shown by a solid line in FIG. 1) has a peak height P in the direction of the thickness and, in general, rapidly descends from the peak height P (in the case of a thickness $t_0$) for smaller thicknesses. In such a thicknesses meter, automatic gain control (AGC) is applied in accordance with a peak value Pm (shown by a dotted line in FIG. 1) of the received pulse, so that the peak value P of the reflection echo $P_1$ from the underside of the object to be measured will be unsaturated the height of the reflection echo $P_1$ greater than the peak P in the directivity of the probe is held substantially constant (indicated by the one-dot chain line in FIG. 1). The height of the reflection echo $P_1$ decreases in a range smaller amount than the wave P, and the accuracy of the measured data is increased. However, highly accurate measured data cannot be obtained a head of the peak P, for example, where the thickness of the object to be measured is smaller than 5mm (the thickness $t_1$ in FIG. 1). This is because, the AGC holds the peak value Pm, and the pulse $P_1$ does not become flat in a range smaller than the peak P as shown in FIG. 1 by a two-dot line $P_1$. Where the object to be measured is relatively thick, a reflection echo $\bar{S}$ arrives at the receiver such as depicted in FIG. 2A but where the object to be measured is relatively thin, that is, less than the aforesaid thickness $t_1$, the reflection echo S will be as depicted in FIG. 2B. In the latter case, the amplitude of a first echo $P_1$ is small because of the directivity shown in FIG. 1, but that of a multiple echo (second, third, ... echoes $S_2, S_3$, ... ) reciprocating between the under surface and the upper surface of the object to be measured increases as will be seen from FIG. 2B. Accordingly, automatic gain control (AGC), is applied to the second, third, ... echoes $S_2, S_3, \ldots$ at their peak values but it is not applied to the first echo $P_1$ value because the peak value is small. This results in inaccuracy in an input signal (a reset signal) supplied to a time measuring circuit formed with an RS flip-flop circuit. It is possible that a first pulse $P_1$ of the first echo $S_1$ such as shown in FIG. 2B is applied as an input signal to the time measuring circuit, the circuit will not be reset by the pulse $P_1$ but will be reset by pulses $P_2$ or $P_3$ subsequent thereto because AGC is not practically accomplished with the echo $S_1$ because its peak value is small. This introduces an error in the data obtained with the time measuring circuit. For example, if the frequency of an exciting wave M is 5MHz, an error of 0.6mm is caused by the fact that a pulse to be reset differs only one and, further, this error becomes inherent to the thickness meter, making highly accurate measurement impossible. For correcting the characteristic of FIG. 1, the degree of AGC has heretofore been adjusted manually, but no satisfactory results could have been obtained.

SUMMARY OF THE INVENTION

This invention has its object to provide a high precision ultrasonic thickness meter which is simple in construction but free from such defects encountered in the prior art.

BRIEF DESCRIPTION OF THE DRAWINGS

FIG. 1 is a graph showing the height of a reflection echo, for explaining this invention;

FIGS. 2A and 2B are waveform diagrams showing the kinds of the reflection echo;

FIG. 3 is a block diagram illustrating one example of a pulse reflection type ultrasonic thickness meter of this invention;

FIGS. 4A and 4B are waveform diagrams, for explaining the example of FIG. 3;

FIG. 5 is a graph showing a peak hold output waveform; and

FIG. 6 is a block diagram illustrating another example of this invention.

DESCRIPTION OF THE PREFERRED EMBODIMENT

The ultrasonic thickness meter of this invention will hereinbelow be described with reference to the drawings.

In FIG. 3, reference character Tm indicates generally the thickness meter and reference numeral 1 designates an object to be measured, for example, a sheet of steel. Reference numeral 2 identifies a probe such that ultrasonic transducer 5a and 5b and delay members 6a and 6b are disposed in left and right rooms 4a and 4b respectively which are isolated from each other by an electric and acoustic shield member 3. In the illustrated example, a transmitter 7 consists of the elements housed in the left-hand room 4a and a receiver 8 consists of the elements housed in the right-hand room 4b, respectively. To the transmitter 7 is connected a pulse oscillator 9 for exciting the ultrasonic transducer 5a and a synchronous oscillator 10 for synchronous oscillation is connected to the pulse oscillator 9. While, a receiving amplifier 11 is connected to the receiver 8 and, at the stage following it, a received signal (the reflection echoes $S_1, S_2, \ldots$) amplified by the receiving amplifier 11 is supplied to a first peak hold circuit 13 through a diode 12 and, at the same time, the received signal is applied as a reset signal to a reset terminal R of the aforementioned RS flip-flop circuit 14. A set terminal S of the flip-flop circuit 14 is supplied with the output from a zero adjuster circuit 15 supplied with a trigger signal from the synchronous oscillator 10. In the present example, a thickness of 5mm is used as the reference of the thickness of the object to be measured 1 and this is zero adjusted and is shifted for a period of time during which a transmitted wave passes through the pair of delay members 6a and 6b and then the flip-flop circuit 14 is set. The flip-flop circuit 14 is set by the output from the zero adjuster circuit 15 and reset by the output from the receiving amplifier 11, so that the flip-flop circuit 14 is actuated for a period of time corresponding to the thickness of the object 1 to derive at its output terminal 16 the measured thickness as the form of a time difference. The output terminal 16 has connected thereto a counter or the like as is well known, though not illustrated.

In the present invention, the gain of the receiving amplifier 11 is controlled so that even if the thickness of the object varies and, for example, is less than $t_1$, the measuring point may always be selected at a substantially fixed point in the reflection echo S. To this end, in the example of FIG. 3 the gain of the receiving amplifier 11 is controlled with the output of the first peak hold circuit 13 (which differs according to the thickness of the object 1 but in this example it is a set value) and an output of the measured value which is produced by voltage conversion of the time difference derived at the output terminal 16. Namely, first and second AGC circuits 17 and 18 are connected in series to each other and their AGC voltages are set different from each other and the AGC voltage is made minimum with the second AGC circuit 18. The first AGC circuit 17 is supplied with an output voltage $V_1$ derived from the first peak hold circuit 13. In the case of such a reflection echo S as shown in FIG. 2B, the peak values of the second echo $S_2$ and those subsequent thereto are held in the peak hold circuit 13 and then supplied to the first AGC circuit 17. While, the output terminal 16 has connected thereto an integrator circuit 19 consisting of a resistor and a capacitor, at the output end of which is derived an output voltage E ($E_1$, $E_2$ and so on) such as depicted in FIG. 4B. Since pulses such as indicated by $q_1$, $q_2$ and $q_3$ in FIG. 4A are obtained whose pulse widths are different according to the time for resetting the flip-flop circuit 14, the output voltage E also varies from $E_1$ to $E_3$ with changes in the time for resetting the flip-flop circuit 14. The output voltage E is supplied through a diode 20 to a second peak hold circuit 21, from which is derived a peak hold voltage $V_2$ such as shown in FIG. 5 which varies in an analogous manner. The peak hold voltage $V_2$ is then applied to the second AGC circuit 18. The first and second AGC circuits 17 and 18 are adapted so that the circuit 18 (or 17) supplied with smaller value of the voltage $V_1$ (or $V_2$) than the other is actuated. For example, where the voltage $V_1$ has a greater value than that of the voltage $V_2$ ($V_1 > V_2$) the second AGC circuit 18 supplied with the voltage $V_2$ is actuated, while where the voltage $V_1$ has a smaller value than the voltage $V_2$ ($V_1 < V_2$), the first AGC circuit 17 supplied with the former is actuated. In practice, the above operation can be achieved, for example, by supplying the voltages to both gates of a dual gate MOS transistor.

Next, a description will be given of the operation of this invention. If, now, the object 1 of a relatively large thickness is measured, a reflection echo such as shown in FIG. 2A is obtained as described previously. At this time, the peak value in the first hold circuit 13 is $v_1$ and this becomes the output voltage $V_1$ which is applied to the first AGC circuit 17. While, since the received signal supplied to the reset terminal R of the flip-flop circuit 14 is the reflection echo S of FIG. 2A, the flip-flop circuit 14 is reset by the received signal. Then, the waveform $q_3$ shown in FIG. 4A is obtained at the output terminal 16, so that the output voltage from the second peak hold circuit 21 becomes $E_3$ ($V_2$). Since thickness greater than that $t_0$ corresponding to the peak P depicted in FIG. 1 is constant, the aforementioned output voltage $V_1$ is equal to or less than the output voltage $E_3$. Consequently, the first AGC circuit 17 is actuated and its AGC voltage is applied to the receiving amplifier 11 to control its gain, providing such a reflection echo as indicated by the one-dot chain line $P_1$ in FIG. 1.

On the other hand, where the thickness T of the object 1 to be measured is smaller than 5mm, for example, a reflection echo S such as depicted in FIG. 2B is produced. In this case, the echo whose peak is held by the first peak hold circuit 13 is the second echo $S_2$ or the subsequent one $S_3$. . . as described previously, so that if the second echo $S_2$ is held at its peak, the output voltage derived from the first peak hold circuit 13 is $v_2$. While, the flip-flop circuit 14 is reset by the first echo $S_1$ shown in FIG. 2B, so that, for example, the waveform $q_2$ of FIG. 4A is derived at the output terminal 16, and accordingly, the output voltage $E_2$ from the second peak hold circuit 21 is lower than the aforesaid output voltage $v_2$ (since $V_1 = v_2$ and $V_2 = E_2$). This implies that the second AGC circuit 18 is actuated instead of the first AGC circuit 17. Since the AGC voltage determined by the second AGC circuit 18 is applied to the receiving amplifier 11, the gain of the receiving amplifier 11 is thereby controlled to approach a set maximum value and the height of the reflection echo becomes flat as indicated by a one dot chain line $P_1$ in FIG. 1. Then, the amplitude of the first echo $S_1$ becomes increased. With an increase in the amplitude, the voltage applied to the reset terminal R of the flip-flop circuit 14 increases, so that the flip-flop circuit 14 is reset by the first pulse $P_1$. Namely, until the application of automatic gain control the flip-flop circuit 14 is reset at the peak value of the second pulse $P_2$ and the subsequent one in the first echo $S_1$ but, upon the application of automatic gain control, the flip-flop circuit 14 is reset by the first pulse $P_1$, so that no error is introduced in the time measurement by the flip-flop circuit 14. Also, where the thickness of the object 1 is close to the set value 5mm, the above-described operations are similarly achieved to control the gain automatically and the thickness measurement is carried out. A three-dot chain line $P_2$ in FIG. 1 shows that the characteristic or the thickness differs according to the pulses $P_1$, $P_2$, . . . of the reflection echo.

With the example of the present invention described above, where the object 1 to be measured is thin, the height of the reflection echo S is retained within a certain range by automatically controlling the gain of the receiving amplifier 11 by obtaining the output (the measured value) from the flip-flop circuit 14 for the time measurement and that (the set value in this case) from the first peak hold circuit 13. Therefore, even if the thickness of the object 1 differs, the thickness measuring point can always be selected at a substantially fixed height in the reflection echo and especially also where the thickness is small, the measuring point can be held constant, so that accurate measurements of thin members can be achieved and also the accuracy of the measurement can be enhanced. Further, as will be seen from FIG. 5, the peak hold output varies in an analogous manner, so that the gain control can be effected smoothly. In addition, even if the condition of the surface of the object 1 on which the probe 2 is mounted is not good, the gain control is carried out, and consequently attenuation of the ultrasonic waves can be compensated for. Further, where the measured value immediately after mounting of the probe 2 is smaller than the set value, the gain of the receiving amplifier 11 increases to further decrease the measured value, so that there is no fear that the second AGC circuit 18 continues to operate to put the whole circuit out of order. It is needless to say that when the measured value exceeds the set value in the course of measurement because the probe 2 does not snugly fit the surface of the object 1, the first AGC circuit 17 immediately operates.

As a result of experiments, it has been ascertained that where the object 1 to be measured is steel, the use of this invention enables accurate measurements of thicknesses from 1.2mm to 100mm. By the way, thicknesses measurable with the prior art are about 1.5 to 20mm and adjustment is required for measuring greater thicknesses.

FIG. 6 illustrates another example of this invention, in which the same reference numerals as those in FIG. 3 indicate the same elements. In the present example, a voltage corresponding to the thickness of 5mm is used as a reference voltage, with which the output from the flip-flop circuit 14 is compared and when the reference voltage is higher than the output from the flip-flop circuit 14, the operation of the AGC circuit is stopped and the gain of the receiving amplifier 11 is controlled to provide a maximum set value. In FIG. 6, reference numeral 25 designates a converter circuit by means of which the time difference obtained with the flip-flop circuit 14 is converted into a voltage, and 26 a comparator circuit which is supplied with the reference voltage through a terminal 26a and from which a compared output is derived where the converted voltage is lower than the reference voltage. The compared output is applied to a gate circuit 27 together with the output from the peak hold circuit 13 and where the compared output is present, an AGC circuit 28 is turned off. It will be easily understood that, also in this case, the same results as those described above can be obtained.

It will be apparent that many modifications and variations may be effected without departing from the scope of the novel concepts of this invention.

I claim as my invention:

1. A pulse reflection type ultrasonic thickness meter comprising:
    a pulse oscillator means for producing a transmission signal;
    an ultrasonic transducer connected to said pulse oscillator means, producing an ultrasonic pulse wave, said ultrasonic pulse wave being transmitted to an object to be measured, and said transducer receiving an echo pulse train including a plurality of pulses from said object;
    a receiving amplifier with a variable gain control receiving the echo pulse train output of said ultrasonic transducer to control the height of a first echo pulse included in said echo pulse train;
    a pulse generator means connected to receive said transmission signal from said pulse oscillator means and said echo pulse train from said receiving amplifier and producing a pulse signal whose duration is proportional to the thickness of said object; and
    an automatic gain control means connected to the variable gain control of said receiving amplifier and receiving a first input from said pulse generator means and a second input from said receiving amplifier and having two output conditions which depend upon which of its two inputs are smaller and such that the smaller of its two inputs control its output condition for controlling the gain of said receiving amplifier.

2. A pulse reflection type ultrasonic thickness meter comprising:
    a pulse oscillator means for producing a transmission signal;
    an ultrasonic transducer connected to said pulse oscillator means and producing an ultrasonic pulse wave, said ultrasonic pulse wave being transmitted to an object to be measured, and said transducer receiving an echo pulses train including a plurality of pulses from said object;
    a receiving amplifier with a variable gain control receiving the echo pulse train output of said ultrasonic transducer to control the height of a first echo pulse included in said echo pulse train;
    a pulse generator means connected to receive said transmission signal from said pulse oscillator means and said echo pulse train from said receiving amplifier and producing a pulse signal whose duration is proportional to the thickness of said object;
    an automatic gain control circuit connected to the variable gain control of said receiving amplifier and receiving a first input from said receiving amplifier;
    an integration circuit receiving the output of said pulse generator means; and
    a peak hold circuit receiving the output of said integration circuit and supplying a second input to said automatic gain control circuit, said automatic gain control circuit having two output conditions which depend upon which of its two inputs are smaller and such that the smaller of its two inputs control its output condition for controlling the gain of said receiving amplifier.

3. A pulse reflection type ultrasonic thickness meter comprising:
    a pulse oscillator means for producing a transmission signal;
    an ultrasonic transducer connected to said pulse oscillator means and producing an ultrasonic pulse wave, said ultrasonic pulse wave being transmitted to an object to be measured, and said transducer receiving an echo pulse train including a plurality of pulses from said object;
    a receiving amplifier with a variable gain control receiving the echo pulse train output from said ultrasonic transducer to control the height of a first echo pulse included in said echo pulse train;
    a pulse generator means connected to receive said transmission signal from said pulse oscillator means and said echo pulse train from said object and producing a pulse signal whose duration is proportional to the thickness of said object;
    an automatic gain control circuit connected to the variable gain control of said receiving amplifier,
    a peak hold circuit receiving an input from said receiving amplifier;
    a converter receiving the output of said pulse generator means;
    a comparator receiving the output of said converter and a reference voltage input; and
    a gate receiving the outputs of said peak hold circuit and said comparator and supplying an input to said automatic gain control circuit from said peak hold circuit when the output of said comparator is less than said reference voltage.

* * * * *